(12) United States Patent
Mabe et al.

(10) Patent No.: US 6,488,394 B1
(45) Date of Patent: Dec. 3, 2002

(54) METHOD FOR FORMING COATING FILM AND VEHICLE LAMP DEVICE FORMED BY THE METHOD

(75) Inventors: Michihiro Mabe; Koichi Nakamura, both of Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/642,690

(22) Filed: Aug. 22, 2000

(30) Foreign Application Priority Data

Sep. 10, 1999 (JP) ............................. 11-257225

(51) Int. Cl.[7] ................................. B05D 5/00
(52) U.S. Cl. ......................... 362/510; 428/429; 428/447
(58) Field of Search ................. 362/510, 293, 362/516, 509, 311, 351; 428/429, 447, 451, 450, 412

(56) References Cited

U.S. PATENT DOCUMENTS

| | | | |
|---|---|---|---|
| 5,130,904 A | | 7/1992 | Ohshio et al. ................. 362/61 |
| 5,353,210 A | * | 10/1994 | Strok et al. .................. 362/293 |
| 5,645,633 A | * | 7/1997 | Ogawa .................... 106/287.14 |
| 6,190,028 B1 | * | 2/2001 | Aikawa et al. ............. 362/510 |

FOREIGN PATENT DOCUMENTS

| | | | |
|---|---|---|---|
| EP | 0 431 979 A2 | 6/1991 | ........... C08L/83/07 |
| GB | 2 045 824 A | 11/1980 | ............. C08J/7/00 |

* cited by examiner

Primary Examiner—Sandra O'Shea
Assistant Examiner—Bao Truong
(74) Attorney, Agent, or Firm—Sughrue Mion, PLLC

(57) ABSTRACT

A method for forming a coating film, comprising making a siloxane bond (Si—O bond)-containing coating composition adhere to a surface of a silicone protective film 3 formed for protecting a vapor deposition layer 2 formed on a surface of a base material 1 to thereby enhance the adsorbability of the coating film 4 to the silicone protective film 3, and a vehicle lamp device formed by using this method.

20 Claims, 2 Drawing Sheets

METHOD FOR FORMING COATING FILM AND VEHICLE LAMP DEVICE FORMED BY THE METHOD

BACKGROUND OF THE INVENTION

1. Field pertinent to the Invention

The present invention relates to a method for forming a coating film, in which a coating composition having high adsorbability to a silicone protective film formed for protecting a vapor deposition layer formed on a surface of a base material is made to adhere to the surface of the silicone protective film, and a vehicle lamp device formed by the method.

2. Description of the Related Art

A general technique for making a coating composition adhere to a surface of a silicone protective film formed for protecting a vapor deposition layer formed on a surface of a base material, that is, for example, a general technique for coating a base material constituting a reflector, an extension reflector, or the like, in a vehicle lamp device used as a car head lamp, or the like, will be described with reference to FIG. 4.

First, to secure the surface smoothness of a base material 10 made of a material such as synthetic resin and enhance the adsorbability of a vapor deposition layer 12, an undercoat layer 11 is provided on a surface of the base material 10 and then the vapor deposition layer 12 of an aluminum vapor deposition film is formed on a surface of the undercoat layer Further, to protect the vapor deposition layer 12 to thereby secure weather resistance, a silicone protective film 13 is formed as a top coat on a surface of the vapor deposition layer 12 by a spray coating method or by a method to which plasma polymerization disclosed in JP-A-10-147876 is applied.

Color coating (enamel coating) 14 such as black coating, silver metallic coating, or the like, is applied onto a surface of the top coat constituted by the silicone protective film 13 for the purpose of enhancing weather resistance and external appearance or the like.

However, when a coating composition such as two-fluid urethane heretofore generally used was used for color coating 14 applied onto the surface of the silicone protective film 13, there was a technical problem that the coating composition was apt to be peeled in the interface between the coating composition and the silicone protective film 13 because the adsorbability of the coating composition to the silicone protective film 13 was insufficient.

SUMMARY OF THE INVENTION

Therefore, an object of the present invention is to provide a method for forming a coating film by using a coating composition highly adsorbable to a silicone protective film, and a vehicle lamp device formed by the coating film-forming method.

To achieve the foregoing object, the present invention employs the following means.

According to a first aspect of the present invention, there is provided a method for forming a coating film which uses means of making a siloxane bond (Si—O bond)-containing coating composition adhere to a surface of a silicone protective film which is formed for protecting a vapor deposition layer formed on a surface of a base material.

In this means, lone-pair electrons of oxygen atoms constituting siloxane bonds are coordinated so as to be bonded to silicon atoms (Si) contained in the silicone protective film so that the adsorbability of the coating composition to the silicone protective film is enhanced to prevent the coating composition from being peeled.

According to a second aspect of the present invention, in the method for forming a coating film, the silicone protective film stated in the first aspect is formed by using a plasma polymerization method.

In the means using such a plasma polymerization method, the adsorbability of the coating composition to the silicone protective film can be enhanced more greatly because the silicone protective film can be formed with a more uniform film thickness compared with the spray coating method.

According to a third aspect of the present invention, in the method for forming a coating film stated in the first or second aspect, an acrylic silicone coating composition is used as the coating composition.

In this means, the adsorbability of the coating composition to the silicone protective film can be secured because terminal oxygen atoms of siloxane bonds (Si—O bonds) crosslinking polyacrylic chains to one another are coordinated so as to be bonded to silicon atoms (Si) contained in the silicone protective film.

According to a fourth aspect of the present invention, in the method for forming a coating film, the acrylic silicone coating composition stated in the third aspect is made to contain an ultraviolet light absorber which is hard to volatilize.

In this means, attention is paid to the fact that an ultraviolet light absorber such as a benzophenone compound contained, to fulfill a function of preventing deterioration due to the sun light, in an acrylic silicone coating composition which is widely used as a coating composition for the exterior of a car, the outer wall of a building, or the like, has such characteristic that the ultraviolet light absorber is apt to volatilize in the condition of 80° C. or higher. Therefore, measures to change the ultraviolet light absorber to a new one hard to volatilize are taken so that the method can be applied safely to a member placed in a high-temperature environment.

According to a fifth aspect of the present invention, in the method for forming a coating film, only a benzotriazole compound is specifically used as the ultraviolet light absorber stated in the fourth aspect. In this means, measures are taken so that the method can be applied safely to a member such as a reflector, an extension reflector, or the like, disposed in the inside of a lamp chamber of a vehicle lamp device, or the like, exposed to a high temperature of 120° C. or higher by heat of a lamp.

According to a sixth aspect of the present invention, in a vehicle lamp device having a front lens permeable to ultraviolet light, a coating film is formed on a member irradiated with ultraviolet light transmitted through the front lens and incident on the member, by using the coating film forming method stated in the fourth or fifth aspect.

In this means, an ultraviolet light absorber hard to volatilize even in a high-temperature environment is contained in a coating composition used for forming a coating film on a vapor deposition film on a member such as a reflector, an extension reflector, a dummy reflection portion, or the like, disposed in the inside of a lamp chamber exposed to such a high-temperature environment by heat of a lamp. Hence, the ultraviolet light absorber is prevented from volatilizing so that the front lens does not get fogged and, at the same time, deterioration due to ultraviolet light is prevented.

As described above, in the coating film-forming method according to the present invention, a coating film highly adsorbable to a silicone protective film for protecting a vapor deposition layer made of an aluminum vapor deposition film, or the like, can be formed. Hence, the method widely contributes to development of coating film-forming techniques in a vehicle lamp device for a car, or the like. Moreover, in various members each coated with the coating film by the coating film-forming method according to the present invention, the coating composition is hard to peel. Hence, the method has a technical significance that products such as a vehicle lamp device, etc. excellent in weather resistance, durability and damage resistance can be provided.

DESCRIPTION OF THE EMBODIMENTS

Preferred embodiments of the present invention will be described below with reference to the accompanying drawings.

Figure 1:
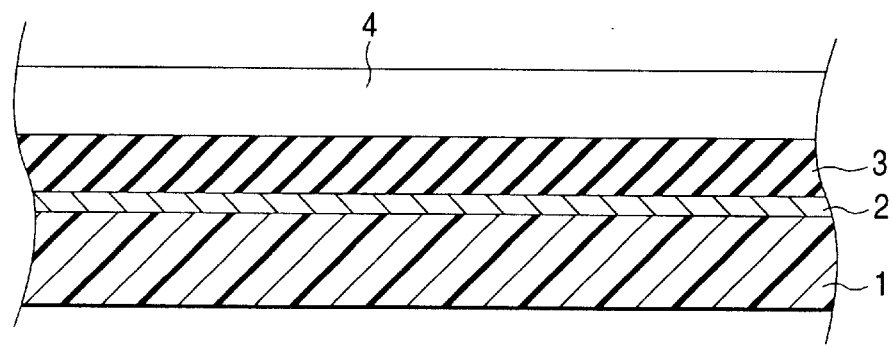
FIG. 1 is an enlarged sectional view of a specific region of a member coated with a coating film formed by a coating film-forming method according to the present invention.

First, FIG. 1 is an enlarged sectional view of a specific region of a member coated with a coating film formed by a coating film-forming method according to the present invention.

In FIG. 1, a base material 1 designated by the reference numeral 1 is a member which is molded of a material such as synthetic resin and which is used in various industrial products such as a vehicle lamp device for a car. For the purpose of reflecting incident light from the outside and from the point of view of improvement in external appearance, or the like, an aluminum film is adherently formed on a surface of the base material 1 by a suitable means such as formation of a vapor deposition film. That is, a so-called vapor deposition layer 2 is provided on the base material 1.

The vapor deposition layer 2 is apt to be peeled from the surface of the base material 1 or damaged by impact, or the like. Moreover, the vapor deposition layer 2 is often easily oxidized or corroded. Therefore, a protective film is generally formed (laminated) on the surface of the vapor deposition layer 2 in order to secure weather resistance.

A silicone protective film 3 excellent in heat resistance, water resistance, weather resistance, electric insulation, etc. is widely used as the protective film.

A method of spraying silicone resin (spray coating method), a method to which plasma polymerization as disclosed in JP-A-10-147876 is applied, and so on, are used for forming the silicone protective film 3. The silicone protective film 3 formed by the method using plasma polymerization is more uniform in thickness than the silicone protective film 3 formed by the spray coating method. Hence, the method using plasma polymerization is preferably used for forming the following coating film because the adsorbability of a coating composition to the silicone protective film is secured easily.

In production of a certain kind of industrial product such as a reflector portion 503 and an extension portion 504 of a vehicle lamp device 5 for a car (see FIG. 3, which will be described later), a so-called enamel coating film (hereinafter referred to as "coating film") 4 made of a mixture of a coating composition and a pigment such as a black pigment or a silver metallic pigment may be further formed on a surface of the silicone protective film 3. The enamel coating film 4 fulfills a function of enhancing weather resistance more greatly as well as a predetermined coloring effect.

The coating film 4 is, however, low in adsorbability (adherence) to the silicone protective film 3. Hence, a problem that the coating film 4 peels or flakes off easily has occurred for a long time. Therefore, the inventor of the present application has examined improvements and devices for coating compositions highly adsorbable to the silicone protective film 3. In the meantime, the inventor has hit on a novel technical idea taking notice of characteristic peculiar to the silicone protective film 3 and has succeeded in developing a novel and advantageous coating film-forming method.

The basic theory of the coating film-forming method according to the present invention will be described below specifically.

Figure 2:
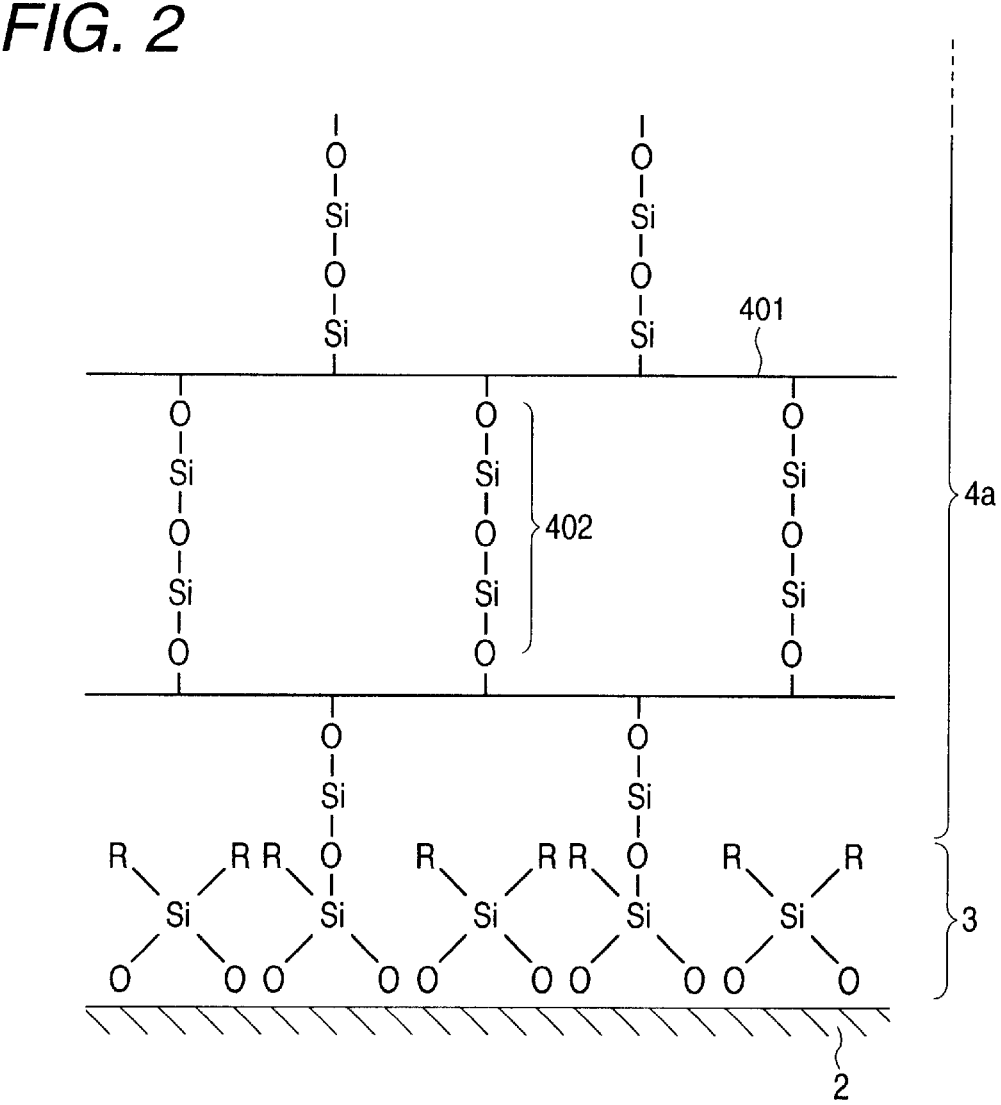
FIG. 2 is a view schematically showing a state in which oxygen atoms constituting siloxane bonds in the coating composition are bonded to silicon atoms in the silicone protective film of the aforementioned member.

As shown in FIG. 2, in the silicone protective film 3 on the vapor deposition layer 2, oxygen atoms O and organic radicals (such as alkyl radicals) R are bonded to silicon atoms Si so that main chains constituting so-called organosiloxane bonds are formed $((SiR_1O)_n)$.

Silicon atoms Si have characteristic of giving a covalent compound having four bonds as well as carbon atoms. Hence, lone-pair electron-including oxygen atoms, or the like, contained in another compound are coordinated easily on void-coordinated silicon atoms Si having only three bonds among the silicon atoms contained in the organosiloxane bonds, so that a four-coordinate covalent compound is given.

Hence, if atoms capable of being coordinated on silicon atoms Si in a void coordination region of the silicone protective film 3 are contained as one of components of a coating composition at the time of formation of the coating film 4 on a surface of the silicone protective film 3, covalent bonds having the strongest bonding force in all intermolecular bonds are obtained. By using the bonding force, the adsorbability of the coating film 4 to the silicone protective film 3 can be enhanced greatly.

The inventor of the present application has found on the basis of this basic theory that a coating composition having siloxane bonds (Si—O bonds) in its components can increase absorbability to the silicone protective film 3 and that an acrylic silicone coating composition 4a (see FIG. 2) having a high-molecular structure in which acrylic chains 401 are crosslinked by siloxane bonds 402 is preferred especially.

It is supposed that this is because lone-pair electrons of oxygen atoms O in the siloxane bonds (Si—O bonds) in the coating composition 4a are coordinated easily on silicon stoms Si in the silicone protective film 3 to thereby form covalent bonds.

Incidentally, adhesion theories such as an adsorption theory, an electric theory, a diffusion theory, etc. are generally used for explaining the mechanism of adhesion of the coating film. According to the adsorption theory, explanation is made so that the coating film 4 is not bonded close to a subject of coating (in this specification, the silicone protective film 3) but an active point in a molecule is bonded to an active point in another molecule. Hence, the force of bonding the active points to each other determines the magnification of adsorbability.

Intermolecular bonding force includes Van der Waals force, hydrogen bonding, covalent bonding, etc. If configuration is made so that the bonding of the active points to each other depends on covalent bonding which is the largest in bonding force, the adsorbability of the coating composition 4 increases greatly.

A vehicle lamp device 5 for a car, produced by using the coating film-forming method according to the present invention will be described below with reference to FIG. 3.

First, the basic configuration of the vehicle lamp device 5 will be described in brief.

The vehicle lamp device 5 has: a synthetic resin lamp body 510 having an opening to be substantially shaped like a bowl; a lamp 505 mounted on the lamp body 510 from the back so as to face a lamp chamber 502; a reflector 503 formed to enclose the lamp 505 and provided for reflecting light toward the front; a shade 506 for reflecting light emitted from the lamp 505 toward the reflector 503; a front lens 501 provided to close the opening of the lamp body 510; and an extension portion 504 extended on the front lens 501 side of the lamp chamber 502 and provided to fulfill a role of hiding a gap 511 between the reflector 503 and the lamp body 510.

Figure 3:
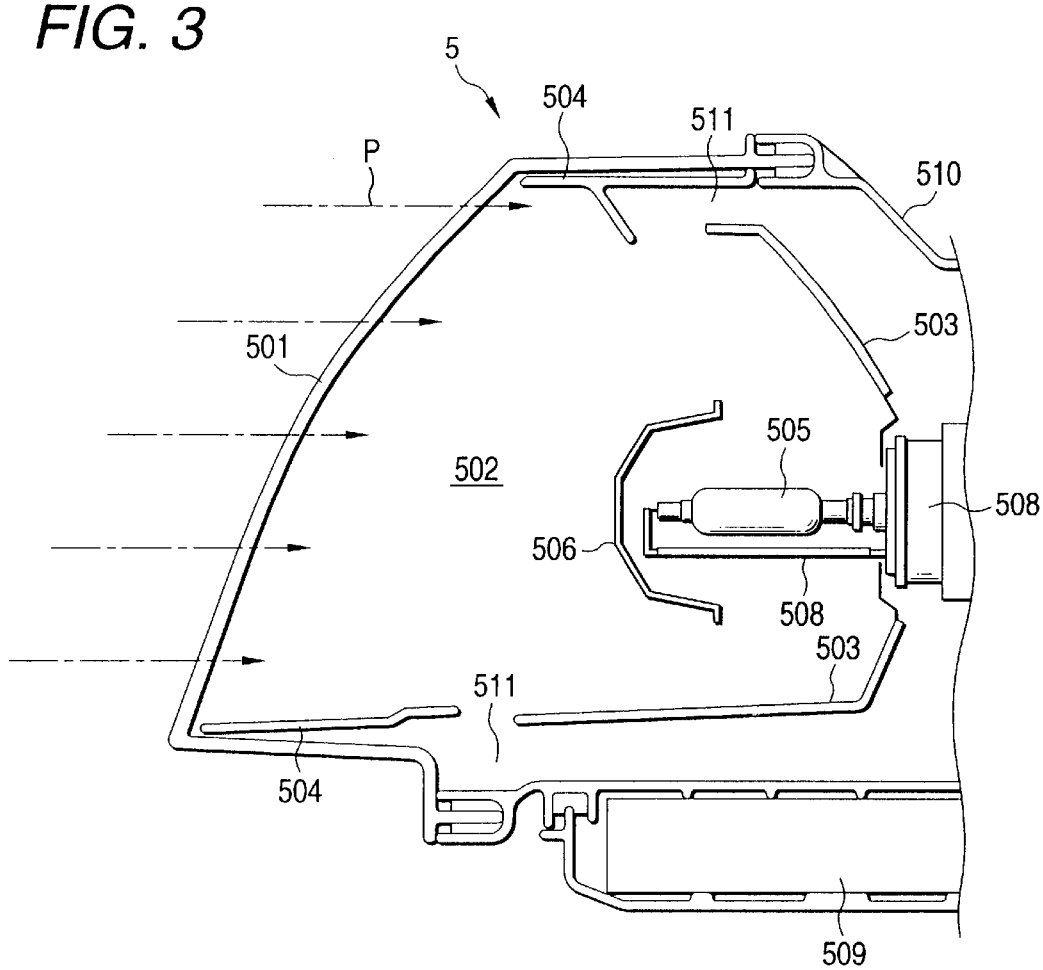
FIG. 3 is a partly cutaway view schematically showing the configuration of a vehicle lamp device having a coating film formed by the coating film-forming method according to the present invention.
Figure 4:
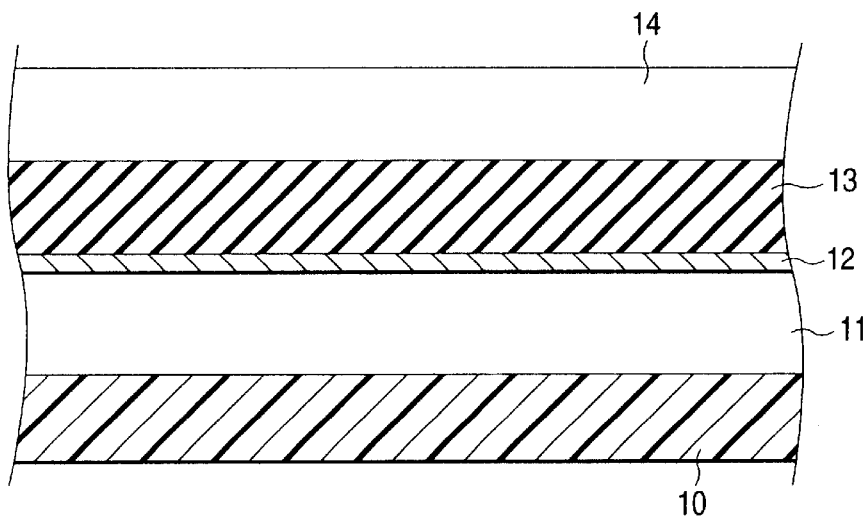
FIG. 4 is a partly sectional view of a member coated with a coating film formed by a background-art coating film-forming method.

Incidentally, the vehicle lamp device shown in FIG. 3 is a so-called discharge type vehicle lamp device using an electric discharge lamp 505 supported by a lead support 508. In FIG. 3, the reference numeral 508 designates a connector attached to the back of the electric discharge lamp 505; and 509, a ballast having a built-in switching circuit unit, or the like.

In the vehicle lamp device 5 configured as described above, portions to which the coating film 4 is to be formed by the coating film-forming method according to the present invention are the reflector 503 and the extension portion 504. That is, the reflector 503 and the extension portion 504 have a partly sectional structure as shown in FIG. 1.

In the case where the front lens 501 of the vehicle lamp device 5 is made of a transparent resin permeable to ultraviolet light, external light P is transmitted through the front lens 501 and enters the lamp chamber 502 together with ultraviolet light.

It is, therefore, necessary that an ultraviolet light absorber is contained in the coating composition for the purpose of preventing deterioration due to the ultraviolet light. An ultraviolet light absorber contained in an acrylic silicone coating composition 4a widely used for coating the exterior of a car, the outer wall of a building, or the like, has characteristic in which the ultraviolet light absorber volatilizes easily in the temperature condition of 80° C. or higher.

The inside of the lamp chamber 502, however, gets into a high-temperature environment of 120° C. or higher because of heat of the lamp 505. If such an available acrylic silicone coating composition 4a is used without any improvement, an ultraviolet light absorber such as a benzophenone composition contained in the coating composition 4a volatilizes easily in the inside of the lamp chamber 502 from an initial stage of switching on the lamp. As a result, the front lens 501 gets fogged, so that the irradiation ability of the lamp device is lowered.

Therefore, the inventor of the present application have tackled development of an ultraviolet light absorber hard to volatilize even in a high-temperature environment of 120° C. or higher. As a result, it has been found that a benzotriazole ultraviolet light absorber is preferred especially. That is, if an ultraviolet light absorber such as a benzotriazole composition which does not volatilize even in a high-temperature environment of 120° C. or higher is used, the front lens 501 can be prevented from getting fogged and deterioration due to ultraviolet light can be prevented effectively.

As described above, the coating film-forming method according to the present invention can be applied to industrial products having various vapor deposition layers formed thereon because the coating film 4 highly adsorbable to the silicone protective film 3 can be formed. Particularly, the coating film-forming method is preferable for a vehicle lamp device because the ultraviolet light absorber hard to volatilize in a high-temperature environment is contained in the coating composition.

Advantageous effects fulfilled by the present invention are as follows.

(1) A coating composition containing siloxane bonds (Si—O bonds) is made to adhere to a surface of a silicone protective film formed for protecting a vapor deposition layer formed on a surface of a base material to constitute various industrial products such as a vehicle lamp device, or the like. Hence, oxygen atoms constituting the siloxane bonds in the coating composition are covalently bonded to silicon atoms (Si) contained in the silicone protective film. As a result, the adsorbability of the coating composition to the silicone protective film can be enhanced greatly, so that the coating composition can be prevented effectively from being peeled.

(2) The silicone protective film to be coated with the coating film is formed by a plasma polymerization method. Hence, the silicone protective film can be formed to be more uniform in thickness. Hence, the adsorbability of the coating composition to the silicone protective film can be enhanced more greatly.

(3) An acrylic silicone coating composition is used for forming a coating film on the silicone protective film. Hence, terminal oxygen atoms of the siloxane bonds (Si—O bonds) crosslinking polyacrylic chains to one another are coordinated on silicon atoms (Si) contained in the silicone protective film so that covalent bonds are formed securely. Hence, the adsorbability of the coating-composition to the silicone protective film can be secured.

(4) An ultraviolet light absorber hard to volatilize is contained in the acrylic silicone coating composition. Hence, the method can be applied to the formation of a coating film on a member placed in a high-temperature environment. Particularly when a benzotriazole composition is used as the ultraviolet light absorber, a coating film can be formed safely on a member such as a reflector or an extension reflector disposed in the inside of a lamp chamber of a vehicle lamp device, or the like, exposed to a high temperature of 120° C. or higher because of heat of the lamp and requiring prevention of deterioration due to ultraviolet light.

(5) As described above, in the coating film-forming method according to the present invention, a coating film highly adsorbable to a silicone protective film for protecting a vapor deposition layer can be formed. Hence, the present invention widely contributes to development of coating film-forming techniques. Moreover, the effect of enhancing the adsorbability of the coating film can provide high-quality products such as a vehicle lamp device, etc. Hence, the present invention contributes to advance of industry.

What is claimed is:

1. A method for forming a coating film, comprising a step of:

forming a coating film by making a coating composition containing a siloxane bond (Si—O bond) adhere to a surface of a silicone protective film which protects a vapor deposition layer formed on a surface of a base material.

2. A method for forming a coating film according to claim 1, wherein said step of forming a coating film comprises a step of making the coating composition adhere to the surface of the silicone protective film so that said siloxane bond forms main chains constituting organolsiloxane bonds $(SiR_2O)_n$) on the surface of the silicone protective film.

3. A method for forming a coating film according to claim 2, wherein said organosiloxane bonds have vacant-coordinated Silicon atoms, and said coating composition contains a compound having lone-pair electron-including oxygen atoms.

4. A method for forming a coating film according to claim 1, wherein said silicone protective film is formed by a plasma polymerization method.

5. A method for forming a coating film according to claim 1, wherein said coating composition is an acrylic silicone coating composition.

6. A method for forming a coating film according to claim 5, wherein said coating composition contains an ultraviolet light absorber which is hard to volatilize.

7. A method for forming a coating film according to claim 5, wherein said coating composition contains an ultraviolet light absorber which is hard to volatilize at a temperature not less than 120° C.

8. A method for forming a coating film according to claim 6, wherein said ultraviolet light absorber is of a benzotriazole type.

9. A vehicle lamp device comprising:

a front lens permeable to ultraviolet light;

a reflecting member irradiated with the ultraviolet light transmitted through the front lens, wherein the reflecting member includes:

a base material;

a vapor deposition layer formed on the base material;

a silicon protective film formed on the vapor deposition layer; and a coating film formed on the silicon protective film so as to form a siloxane bond (Si—O bond) on the surface of the silicone protective film.

10. A vehicle lamp device according to claim 9, wherein said coating film is constituted so that a siloxane bond in said coating film forms main chains constituting organosiloxane bonds $((SiR_2O)_n)$ on the surface of the silicone protective film.

11. A vehicle lamp device according to claim 10, wherein said organosiloxane bonds have vacant-coordinated Silicon atoms, and said coating composition contains a compound having lone-pair electron-including oxygen atoms.

12. A vehicle lamp device according to claim 9, wherein said silicone protective film is a film formed by a plasma polymerization method.

13. A vehicle lamp device according to claim 9, wherein said coating composition is an acrylic silicone coating composition.

14. A vehicle lamp device according to claim 14, wherein said coating composition contains an ultraviolet light absorber which is hard to volatilize.

15. A vehicle lamp device according to claim 14, wherein said coating composition contains an ultraviolet light absorber which is hard to volatilize at a temperature less than 120° C.

16. A vehicle lamp device according to claim 9, wherein said ultraviolet light absorber is of a benzotriazole type.

17. A vehicle lamp device according to claim 9, wherein said vehicle lamp device comprises a reflector equipped within a discharge lamp.

18. A vehicle lamp device according to claim 17, wherein said base material is made of resin, said a vapor deposition layer is made of aluminum thin film, and said coating film is made of an enamel coating film made of a mixture of the coating composition and a pigment.

19. A method for forming a coating film according to claim 1, wherein the coating film is an enamel coating film including a coating composition and a pigment.

20. A vehicle lamp device according to claim 9, wherein the coating film is an enamel coating film including a coating composition and a pigment.

* * * * *